(12) United States Patent
Matsunaga (10) Patent No.: US 8,142,078 B2
(45) Date of Patent: Mar. 27, 2012

(54) MATERIAL-FILLED PACKAGE

(75) Inventor: Shinji Matsunaga, Chikushino (JP)

(73) Assignee: Kyoraku Co., Ltd., Tokyo (JP)

( * ) Notice: Subject to any disclaimer, the term of this patent is extended or adjusted under 35 U.S.C. 154(b) by 1167 days.

(21) Appl. No.: 11/576,602

(22) PCT Filed: Oct. 4, 2005

(86) PCT No.: PCT/JP2005/018714
§ 371 (c)(1),
(2), (4) Date: Sep. 12, 2007

(87) PCT Pub. No.: WO2006/038700
PCT Pub. Date: Apr. 13, 2006

(65) Prior Publication Data
US 2008/0112654 A1    May 15, 2008

(30) Foreign Application Priority Data
Oct. 4, 2004   (JP) ................................ 2004-290881

(51) Int. Cl.
B65D 33/00      (2006.01)
B65D 33/16      (2006.01)
B65D 30/00      (2006.01)
B65D 30/08      (2006.01)
(52) U.S. Cl. ........... 383/210; 383/66; 383/107; 383/116
(58) Field of Classification Search .................. 383/210, 383/116, 107, 211, 66
See application file for complete search history.

(56) References Cited

U.S. PATENT DOCUMENTS 2,293,952 A * 8/1942 Stroop ........................ 383/210
2,997,166 A * 8/1961 Pratt ............................ 206/440
3,332,603 A * 7/1967 Kamins ....................... 206/260
(Continued)

FOREIGN PATENT DOCUMENTS

JP            64053075      *  3/1987
(Continued)

OTHER PUBLICATIONS

PCT Search Report dated Nov. 1, 2005 of Patent Application No. PCT/JP2005/018714 filed Oct. 4, 2005.

*Primary Examiner* — Jes F Pascua
(74) *Attorney, Agent, or Firm* — Vern Maine & Associates (57) ABSTRACT

A filling-packaging body formed to have both such a durability that can withstand a large amount of filled material filled therein and easily unsealing property. The filling-packaging body (1) is formed by filling the filled material in a three-side seal bag having an overlapped part formed by cylindrically curving a laminated film (10) and overlapping both side edge parts of the laminated film, a plurality of vertical seal parts (2*a*) and (2*b*) (two seal parts are shown) formed at the overlapped part roughly parallel with each other in such a state that a band-like non-seal part (5) is left at the tip side of the outer surface side-edge part of the overlapped part, and lateral seal parts (3) and (4) formed to cross the longitudinal both end parts of the vertical seal parts (2*a*) and (2*b*). The laminated film (10) is formed by interposing a base material layer (12) for imparting strength to the film between an inner layer (11) and an outer layer (13) which are seal layers formed of a low density polyethylene.

11 Claims, 9 Drawing Sheets

U.S. PATENT DOCUMENTS

| | | | |
|---|---|---|---|
| 3,471,005 A * | 10/1969 | Sexstone | 206/260 |
| 3,623,653 A * | 11/1971 | Work | 229/87.05 |
| 3,721,603 A * | 3/1973 | Takeda | 428/36.1 |
| 3,838,549 A * | 10/1974 | Pepmeier | 53/451 |
| 4,252,238 A * | 2/1981 | Spiegelberg et al. | 383/210.1 |
| 4,402,403 A * | 9/1983 | Focke et al. | 206/245 |
| 4,826,011 A * | 5/1989 | Jud | 206/484 |
| 5,407,278 A * | 4/1995 | Beer | 383/38 |
| 5,622,432 A * | 4/1997 | Zicker | 383/210 |
| 5,885,673 A * | 3/1999 | Light et al. | 428/35.4 |
| 6,170,985 B1 * | 1/2001 | Shabram et al. | 383/100 |
| 6,203,867 B1 * | 3/2001 | Derkach et al. | 428/35.2 |
| 6,244,746 B1 * | 6/2001 | Tokita et al. | 383/1 |
| 6,428,209 B1 * | 8/2002 | Janssen | 383/93 |
| 6,440,508 B1 * | 8/2002 | Tokita et al. | 428/35.2 |
| 6,471,401 B1 * | 10/2002 | Tokita | 383/1 |
| 6,984,067 B2 * | 1/2006 | Tokita | 383/1 |
| 7,527,839 B2 * | 5/2009 | Busche et al. | 428/34.9 |
| 2003/0223656 A1 * | 12/2003 | Razeti et al. | 383/66 |
| 2004/0146226 A1 * | 7/2004 | Wolak et al. | 383/210 |
| 2005/0220376 A1 * | 10/2005 | Tsukanome et al. | 383/109 |
| 2006/0098902 A1 * | 5/2006 | Leighton | 383/204 |
| 2006/0257056 A1 * | 11/2006 | Miyake et al. | 383/103 |

FOREIGN PATENT DOCUMENTS

| | | |
|---|---|---|
| JP | 64-53075 | 3/1989 |
| JP | 05-077860 | 3/1993 |
| JP | 2000-177750 | 6/2000 |
| JP | 2003-072001 | 3/2003 |
| JP | 2004-043025 | 2/2004 |
| JP | 2004-123487 | 4/2004 |
| JP | 2004-269053 | 9/2004 |
| WO | 9720693 A1 | 6/1997 |
| WO | 2006038700 A1 | 4/2006 |

* cited by examiner

MATERIAL-FILLED PACKAGE

RELATED APPLICATIONS

This application is a US National Phase of PCT Application No. PCT/JP2005/018714, filed 4 Oct. 2005, which claims priority to Japanese Patent Application No. JP 2004-290881, filed 4 Oct. 2004. Each of these applications is herein incorporated in its entirety by reference.

TECHNICAL FIELD

The present invention relates to a material-filled package having an easy-to-unseal property to be very easily unsealed and capability of storing a large amount of a fill material.

BACKGROUND

An invention according to Japanese Utility Model Application Laid-Open No. 64-53075 discloses an easily unsealable package that is easily unsealable, as described herebelow.

Figure 8:
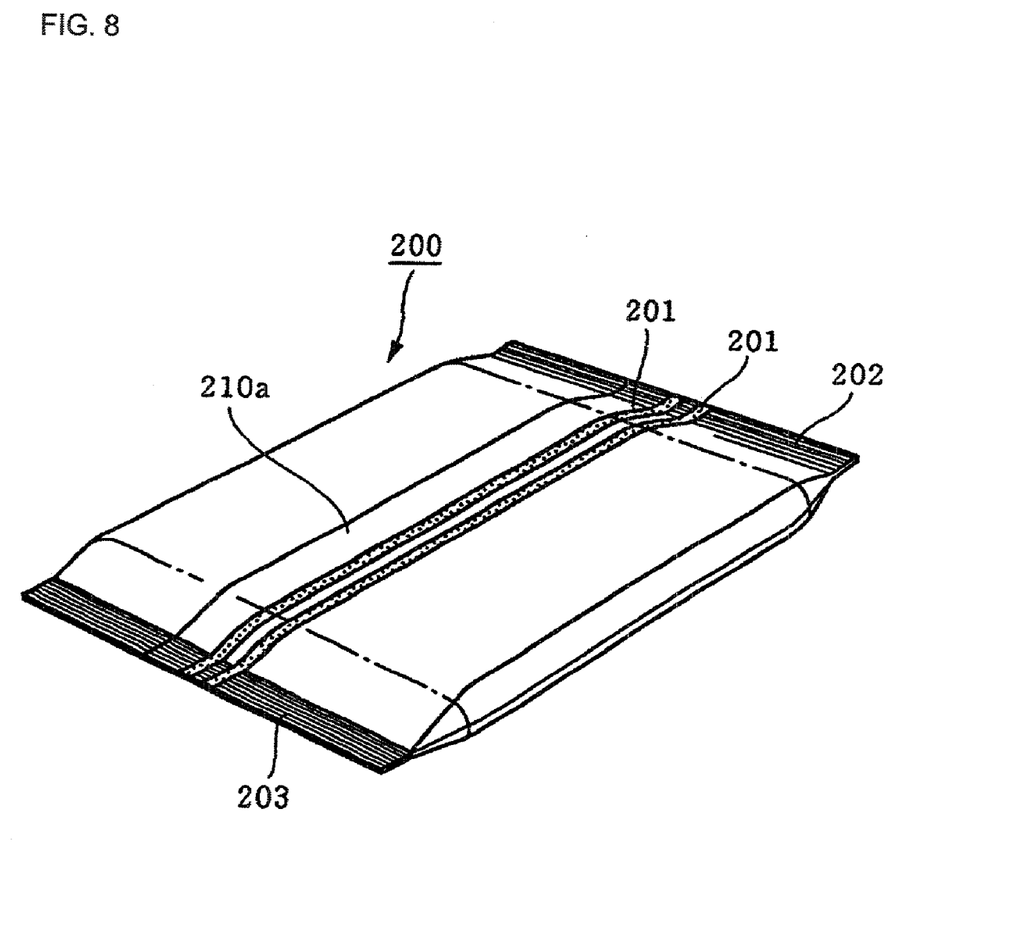
FIG. 8 is a schematic perspective view of one conventional example of an easily unsealable package.
Figure 9:
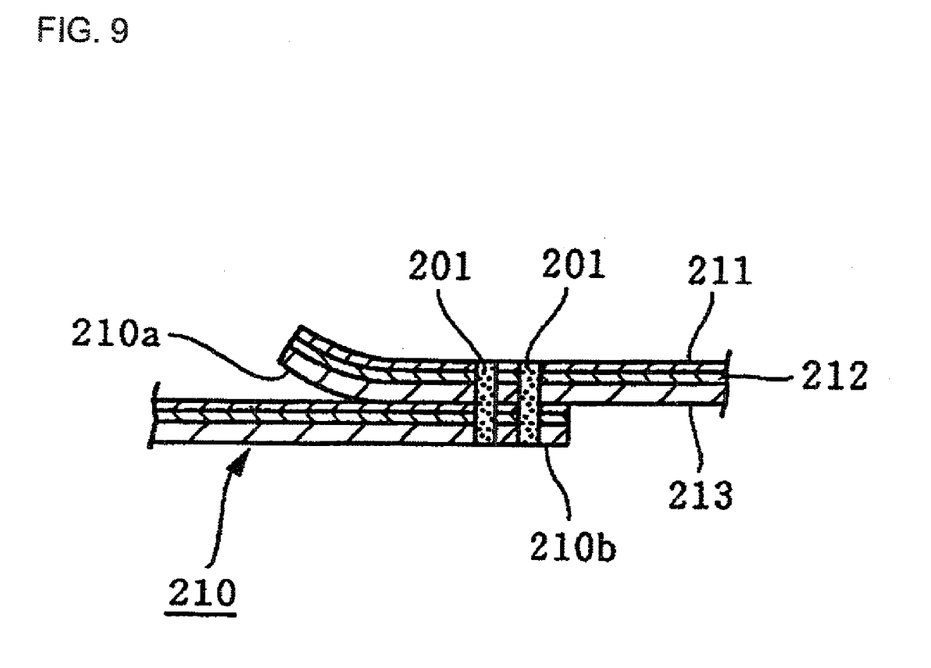
FIG. 9 is a schematic partial sectional view of an overlap portion where a vertical seal portion is formed.

With reference to FIGS. 5(a) and 5(b), an easily unsealable package 200 is formed in the following manner. A laminated film 210 is arcuately bent into a tubular shape, and a film overlap portion is formed by arranging both-side arcuate lateral edge portions 210a and 210b thereof to overlap with one another. Then, the lateral edge portion 210a, which is a band-like non-seal portion and which is used as a pinch portion, is formed in a lateral edge portion on an outer surface side. In this state, two longitudinal seal portions 201 and 201 formed of a plurality of easily unsealable seals are formed substantially in parallel to each other, thereby to form a tubular package. Thereafter, one of two opening portions located in upper and lower portions of the package is sealed along the direction perpendicular to the direction of a longitudinal seal portion, thereby to form a lateral horizontal seal portion 202. Then, a viscous liquid, such as a tubular pasty food item, is filled into the interior of the package from the remaining opening portion of the package, and then remaining of the package is sealed, thereby to form the lateral seal portions 202 and 203.

The laminated film 210 thus used for the package is formed using a tri-laminated film, in which a drawn polypropylene is used for an outer layer 211, polyethylene is used for an intermediate layer 212, and an ethylene-vinylacetate copolymer is used for an inner layer 213. By use of the easily unsealable seals, the longitudinal seal portions 201 and the lateral seal portions 202 and 203 are provided to have the seal strengths of 1.0 to 2.6 (kg/15 mm). The package can be unsealed in the manner that the lateral edge portion 210a on the outer surface side is pinched by fingers and pulled.

The package disclosed in Patent Document 1 has problems. More specifically, in the easily unsealable package disclosed in Patent Document 1, surfaces of the drawn polypropylene of the outer layer and the ethylene-vinylacetate copolymer of the inner layer are thermally welded to each other. For this reason, a thermal welding temperature has to be set to be high in order to obtain a thermal weld strength to prevent tearing during, for example, transportation or usage of the package. As a consequence, a problem takes place in that since a separation strength is too high, it is difficult to obtain a predetermined easily unsealable seal strength. A second problem is that, because of thermal welding, the durability of components is reduced, and concurrently, the manner of processing leads to an increase of electric energy for obtaining heat. A third problem is that the tri-laminated film is expensive, so that there is introduced high costs of package materials themselves.

Japanese Patent Application Laid-Open (JP-A) No. 2004-43025 discloses a multilayered bag and a manufacturing method therefore and a bag-making, material-filling dual-structured bag. However, there are no descriptions regarding easily unsealable configuration of the multi-structured bag.

JP-A-2003-72001 discloses a laminated film and a package formed using the film. In the publication, there are descriptions regarding resin compositions of the film to achieve the easy-to-unseal property. However, there are neither descriptions regarding adaptation of the easy-to-unseal property to a material-filled package nor descriptions regarding researches and investigations on issues in the event of adaptation of the easy-to-unseal property to dual-structured bags.

SUMMARY OF THE INVENTION

One embodiment of the present invention has been made in view of the above-described pending problems with the conventional techniques. An object of one embodiment of the present invention is to provide a material-filled package having both durability for a large amount of a fill material and easy-to-unseal property.

In order to achieve the object described above, a material-filled package of one embodiment of the present invention includes: an overlap portion formed in a manner that a laminated film is arcuately bent into a tubular shape and both-side edge portions of the laminated film are overlapped; a plurality of vertical seal portions formed substantially in parallel to one another in a state where a band-like non-seal portion is remained on an end side of a lateral edge portion on an outer surface side in the overlap portion; and lateral seal portions respectively formed to intersect with both longitudinal end portions of the vertical seal portions. The material-filled package is provided with a laminated film that includes a seal layer formed from a low density polyethylene, and a base layer imparting a film strength, and that the vertical seal portions and the lateral seal portions are each composed of a coagulatively peelable and easily unsealable seal.

Another material-filled package of one embodiment of the present invention includes a fill material filled into a three-way sealed bag, the material-filled package including: an overlap portion formed in a manner that a double-laminated film formed by flattening a tubular body formed from a laminated film is arcuately bent into a tubular shape and both-side edge portions of the double-laminated film are overlapped; a plurality of vertical seal portions formed substantially in parallel to one another in a state where a band-like non-seal portion is remained on an end side of a lateral edge portion on an outer surface side in the overlap portion; and lateral seal portions respectively formed to intersect with both longitudinal end portions of the vertical seal portions. The material-filled package is provided with a laminated film that includes a seal layer formed from a low density polyethylene, and a base layer imparting a film strength, and that the vertical seal portions and the lateral seal portions are each formed from an easily unsealable seal.

In the material-filled package of one embodiment of the present invention, the vertical and lateral seal portions can be formed securely into the coagulatively peelable and easily unsealable seals. More specifically, thermal weldability of the seal layer formed from the low density polyethylene has high, and a tolerance range of thermal welding conditions for performing thermal welding with a desired seal strength is large, so that the coagulatively peelable and easily unsealable seal can be securely formed.

In addition, even when impacts are imposed on the material-filled package during steady operation, the base layer is elongated to thereby absorb the impacts, so that there is no risk of bag-fracture.

Further, the plurality of vertical seal portions are formed at an interval from one another. Therefore, when the band-like non-seal portion is pinched by fingers and pulled, the inner-side vertical seal portions can be serially peeled starting from the vertical seal portion on the side of the non-seal portion (outer side). For this reason, pulling forces necessary for peeling are distributed, and thus, the seals can be peeled with small pulling forces.

As a consequence, the material-filled package having both the easy-to-unseal property and durability and capable of storing a large amount of a fill material can be securely manufactured.

A business-use material-filled package manufactured by a pillow packaging machine is filled with a 1 to 20 kg storage material. Thus, the package is required to have durability before being unsealed for preventing bag-fracture occurrable accidental peeling of the seal portion and easy-to-unseal property to be very easily unsealed.

As a result of iterative experiments, it has been found that a desired seal strength can easily be obtained in thermal welding by using the seal layer formed from the low density polyethylene and the laminated film including the base layer imparting the film strength. Concurrently, it has been learned that when impacts have been imposed, the impacts can be absorbed by elasticity of the laminated film.

The material-filled package of one embodiment of the present invention is manufactured by the pillow packaging machine in accordance with the findings described above by using the seal layer formed from the low density polyethylene and the laminated film including the base layer imparting the film strength.

DETAILED DESCRIPTION

Practical embodiments of the present invention will be described below with reference to the accompanying drawings.

A material-filled package will be described herebelow.

Figure 1:
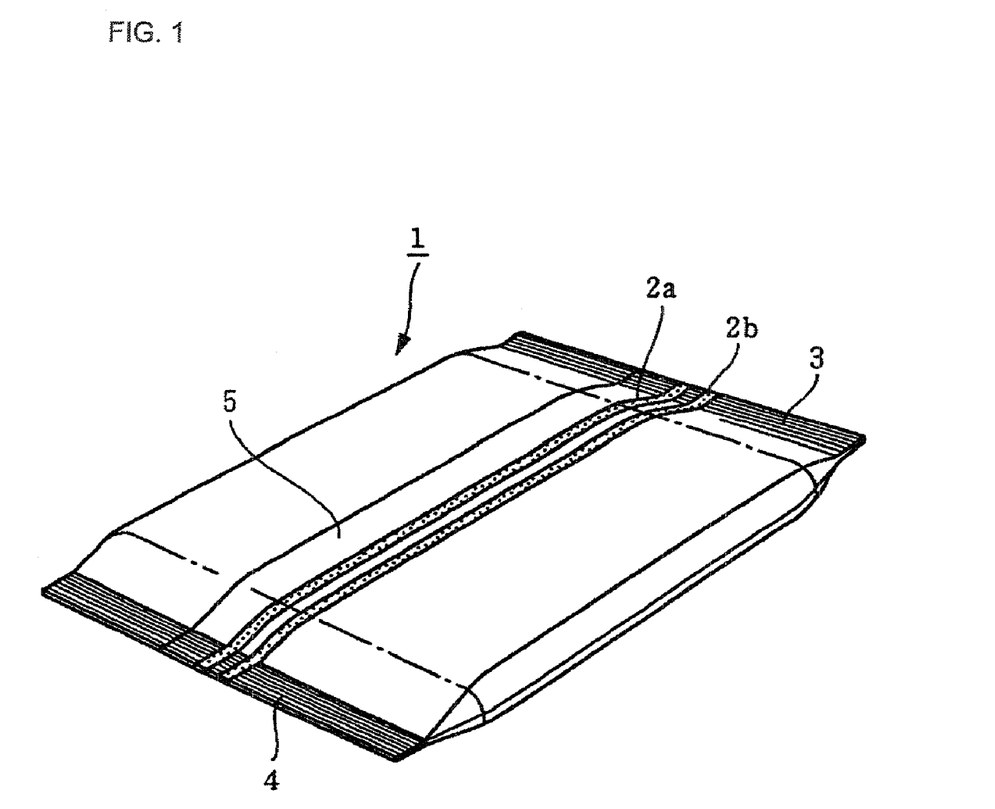
FIG. 1 is a perspective view of a material-filled package in accordance with an embodiment.
Figure 2:
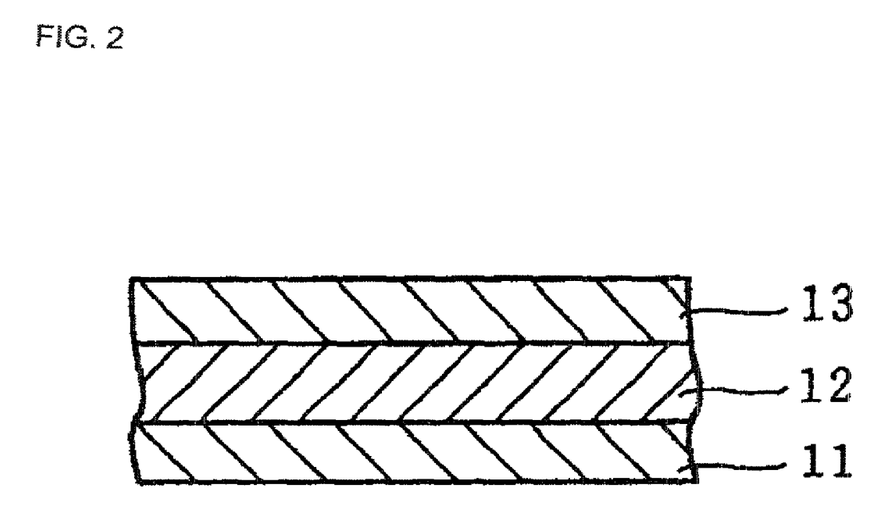
FIG. 2 is a partially enlarged cross sectional view of a laminated film used for the material-filled package.

With reference to FIGS. 1 and 2, a material-filled package 1 of the present embodiment is manufactured by a pillow packaging machine by using a laminated film 10. In the laminated film 10, a base layer 12 made of a non-oriented polyamide or ethylene-a olefin copolymer is interposed between an inner layer 11 and an outer layer 13 made of low density polyethylene. The laminated film 10 can be thermally weldable a relatively low temperature of from 110 to 180° C., or in one embodiment from 120 to 130° C., and the seal strength of a thermal weld portion can be stably adjusted to a predetermined value.

An easily unsealable package 1 is formed in the following manner. The laminated film 10 is arcuately bent into a tubular shape, and an overlap portion 6 (refer to FIG. 3) is formed by arranging both-side arcuate lateral edge portions thereof to overlap with one another. Then, in the state where a band-like non-seal portion 5 having a width (10 to 20 mm), which portion can be pinched by fingers, is remained on the side of an end 5a of one of the lateral edge portions located on the outer surface side in the overlap portion 6, a first vertical seal portion 2a is formed in substantially parallel. In addition, a second vertical seal portion 2b is formed substantially in parallel to an inner side (opposite side to the non-seal portion) at a predetermined interval therefrom, thereby to form a tubular body.

Then, the interior of the tubular body is filled with a predetermined amount of a fill material, lateral seal portions 3 and 4, respectively, are formed to intersect with the vertical seal portions 2a and 2b, thereby to seal the tubular body.

An easily unsealable seal will be described herebelow.

The respective vertical seal portions 2a, 2b and lateral seal portions 3, 4 each are a coagulatively peelable and easily unsealable seal. Thereby, the respective vertical seal portions 2a, 2b, lateral seal portions 3, 4 do not peel before being unsealed to take out the fill material from the material-filled package 1. In addition, the respective vertical seal portions 2a, 2b, lateral seal portions 3, 4 are easily separated only by pinching the band-like non-seal portion 5 by fingers and pulling when being unsealed.

The seal width of the vertical seal portion can be smaller than 15 mm to facilitate unsealing in the event of unsealing by pinching the band-like non-seal portion 5 by fingers.

The coagulatively separable and easily unsealable seal is separated in the manner that the seal layer itself is fractured, so that cobwebbing does not take place. Therefore, there occurs no risky event in which fractures are mixed into the fill material. Further, separation can be made in a smooth manner with a stable seal strength, and temperature dependency is very low. Further, a purely white separation mark occurs on a separated surface. With the purely white separation mark, it can be visually verified by separation whether the seal is appropriately formed, the mark can also be utilized to verify the seal state during packaging processing steps. As a consequence, reliability of the fill material can be maintained.

The base layer can be formed using any one of, for example, non-oriented polyamide, drawn polyamide, ethylene-U olefin copolymer, polypropylene, high density polyethylene, and linear low density polyethylene. Especially, the non-oriented polyamide has good balance in mechanical strength, anti-pinhole property, and seal stability, and is therefore well suited for use as a base layer of a material-filled package that is formed from a dual laminated film.

A packaging machine will now be described herebelow.

Figure 5:
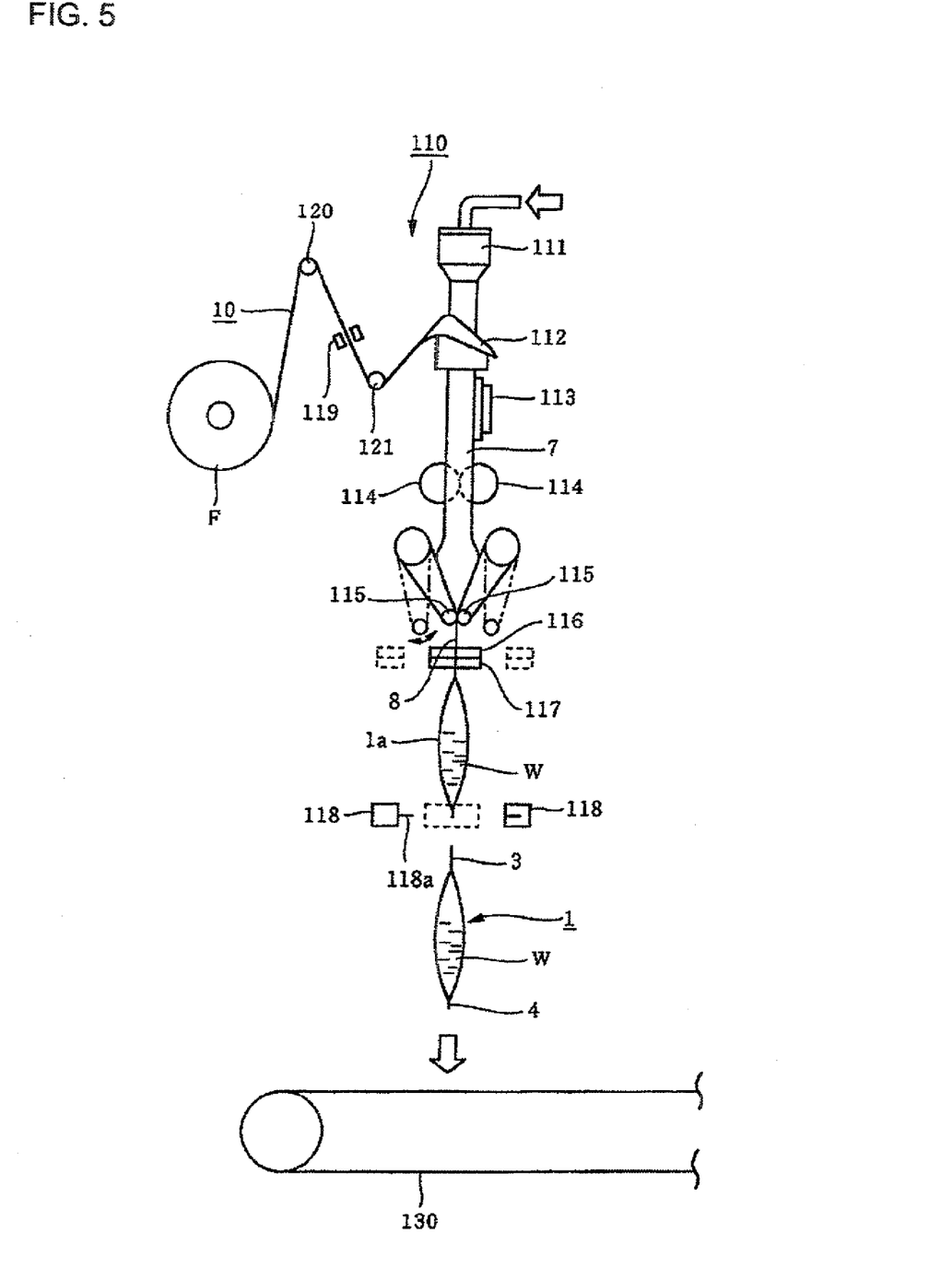
FIG. 5 is an explanatory schematic view showing one example of a manufacturing apparatus for a material-filled package in accordance with one embodiment of the present invention.

FIG. 5 shows a feed completion state of the laminated film 10 in a steady operation mode. In a press smoothed portion 8 flattened in the manner that openable and closable drawing rolls 115 are closed to press smooth an upper opening portion side of a pre-separation material-filled package 1a, a thermal weld portion having the strength of the easily unsealable seal between an area becoming a lower lateral sealing portion 4 and an area becoming an upper lateral sealing portion 3 is serially formed from the upstream side to the downstream side by closing a lateral sealing device including a first lateral sealing device 116 and a second lateral sealing device 117. Then, openable and closable press cutters 118 are opened, and the manufactured material-filled package 1 is dropped on a conveyor 130.

In one embodiment of the present invention, the first lateral sealing device 116 and second lateral sealing device 117 allow setting of welding conditions independently of each other. By setting the first lateral sealing device 116 and second lateral sealing device 117 to substantially a same welding pressure and also setting the welding temperatures of the first lateral sealing device 116 and second lateral sealing device 117 to a temperature enabling the coagulatively separable and easily unsealable seal to be obtained, the respective areas becoming the upper lateral seal portion 3 and lower lateral seal portion 4 are formed at the same time.

Figure 3:
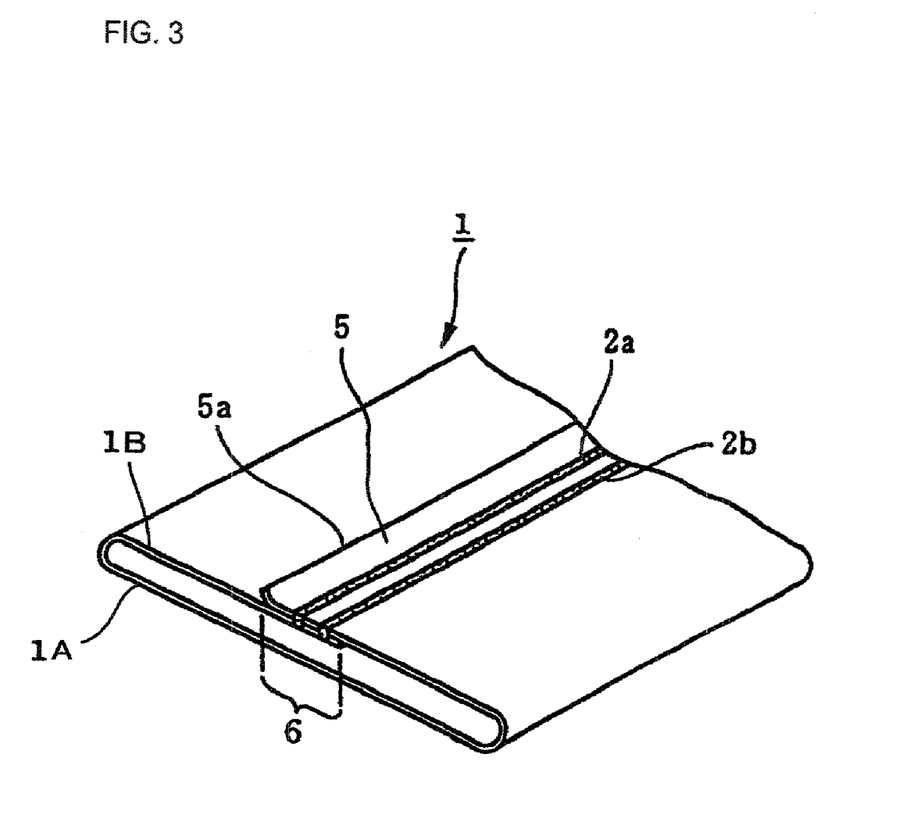
FIG. 3 is a partial perspective view of a state where a single laminated film is formed into a tubular shape.

An overlap portion 6 as shown in FIG. 3 is thermally welded while being moved through a vertical sealing device 113. Then, the vertical seal portions 2a and 2b having the easy-to-unseal seal strength are formed substantially in parallel to the inner side portion remaining the band-like non-seal portion 5 being used to be a pinching piece. Thereby, a continuous tubular body 7 is formed.

At the time when a portion of the tubular body 7 filled with a fill material W is passed through the press-rolling rolls 115, the press-rolling rolls 115 are closed to thereby press smooth an upstream side of the filled fill material W in the tubular body 7, whereby the press smoothed portion 8 is formed.

The manufacturing method will be described herebelow.

The manufacturing method for the material-filled package in accordance with one embodiment of the present invention will be described in more detail with reference to an exemplary case where the material-filled package in accordance with the present embodiment is manufactured by using a pillow packaging machine 110 as shown in FIG. 5. In the manufacturing method, first to fifth steps are carried out in that order, whereby the packaging apparatus is intermittently operated. The first step forms the film into a tubular shape, the second step carries out vertical sealing, the third carries out lateral sealing of a bag's lower portion, the fourth step fills a storage material, the fifth step carries out lateral sealing of a bag's upper portion, the fifth step cuts a continuous bag along a boundary line.

The respective steps will be sequentially described herebelow.

First step of forming the film into a tubular shape: A laminated film 10 fed from a roll-shaped original fabric F is guided to a former 112 through a plurality of feed rollers 120 and 121. Reference Numeral 119 denotes a registration mark sensor that senses a registration mark printed on the laminated film 10 at fixed interval along the long-side direction and that works to cause the film is fed by a fixed feed length on a track of the packaging machine. The laminated film 10 is arcuately bent into the tubular shape while passing through the former 112, and then is formed into a shape in which both-side edge portions of bent ends overlap with one another.

Second step of carrying out vertical sealing: An overlap portion 6 is formed by overlapping as described above, and the overlap portion 6 is thermally sealed by using the vertical sealing device 113, whereby two vertical seal portions 2a and 2b as shown in FIG. 3 are formed.

Third step of carrying out lateral sealing of a bag's lower portion: The openable and closable press-rolling rolls 115 are closed, thereby to press smooth an upper opening portion side of a tubular body 7 formed from the laminated film 10. The lateral sealing device, which includes the openable and closable first and second lateral sealing devices 116 and 117, is closed to thereby form a lateral sealing portion 4 in the bag's lower portion (refer to FIG. 1), that is, the thermal weld portion having the easily unsealable seal strength, is formed on the track of the packaging machine. The lateral sealing portion is thus formed in a press-rolling portion 8, which is a part of the tubular body 7 flattened by performing press smoothing described above.

Fourth step of filling a storage material: After the above, a predetermined amount of the fill material W is entered from a hopper 111, thereby to fill the tubular body 7 with the fill material W.

Fifth step of carrying out lateral sealing of a bag's upper portion: After the press-rolling rolls 115, the first lateral sealing device 116, and the second lateral sealing device 117 have been opened, the lateral sealing portion 4 is rotated. Thereby, together with a pre-separation material-filled package 1a, the tubular body 7 and the laminated film 10 following it are fed by a predetermined length. Then, the first lateral sealing device 116 and second lateral sealing device 117 are closed, and the press smoothed portion 8 is thermally welded. Thereby, the area becoming the lateral sealing portion 3 of the bag's upper portion is welded by the second lateral sealing device 117, and the subsequent area becoming the lateral sealing portion 4 in the bag's lower portion which is continued thereto and which is positioned upstream of the track is welded. Thereby, a pre-separation material-filled package 1a is manufactured.

Fifth step of cutting a continuous bag along a boundary line: The press cutters 118 are closed to nip the area becoming the lower lateral sealing portion 4 and the area becoming the upper lateral sealing portion 3, which areas are in the thermal weld portion to which the pre-separation material-filled packages 1a are connected to, to halve the boundary therebetween, and to drop the material-filled package 1 on the conveyor 130.

In the case where the storage material is a heavy material having a weight of from 3 kg to 20 kg, it may be preferable that a technical measure is taken to prevent the lateral seal portion located in the bottom portion of the bag in the packaging stage from being peeled or fractured before cooling is not completed. In order to achieve the object described above, it is effective that the strength of the lateral seal portion becoming the bag's upper portion is differentiated from the weld strength of the lateral seal portion becoming the bag's lower portion. For example, the peel strength (N/15 mm) along the vertical direction with respect to the seal direction is set such that the strength of the lower seal is 11.8 relatively to the strength of 9.0 of the upper lateral seal portion.

A bag such as described above can be obtained by setting the welding conditions, such as temperatures, to be different for the respective first and second lateral sealing devices.

By way of practical examples of the strengths of the seal portions, when the peel strength (N/15 mm) in the case of the vertical direction with respect to the seal direction is in the range of from 5.0 to 12.0, the peel strength (N/seal-width) in the case of the vertical direction with respect to the seal direction in one embodiment is within a range of from 1.0 to 5.5. This may be desired in terms of packaging of the heavy material or easy-to-unseal property. With reference to FIG. 1, in the configuration thus formed, the non-seal portion 5 is pinched by fingers and then forces act to occur peeling in the vertical direction with respect to the seal direction. Then, the first vertical seal portion 2a and then second vertical seal portion 2b are peeled; and continually the right halves of the upper and lower lateral seal portions 3 and 4 are peeled; and then, if necessary, the left halves of the upper and lower lateral seal portions 3 and 4 are peeled.

One embodiment of the present invention is not limited to the packaging machine and manufacturing method described and shown in the above. A conventionally known packaging machine and manufacturing method can be employed. For example, for the first lateral sealing device 116 and second lateral sealing device 117, an integral sealing machine in which common devices, such as temperature adjustment and driving means, can be used. Further, one embodiment of the present invention can be carried out with a configuration in which the press cutters 118 are omitted and, instead, a cutter device is included in a sealing mechanism for firstly performing lateral sealing is used. Moreover, the storage materials can be entered not only intermittently into the hopper 111, but also can be entered continuously thereinto. In the case of continuous entry, means for holding the storage material in the packaging stage, such as a press-smoothing roller 112, is indispensable.

A material-filled package formed from a dual-structured bag according to a second embodiment will be described herebelow.

Figure 4:
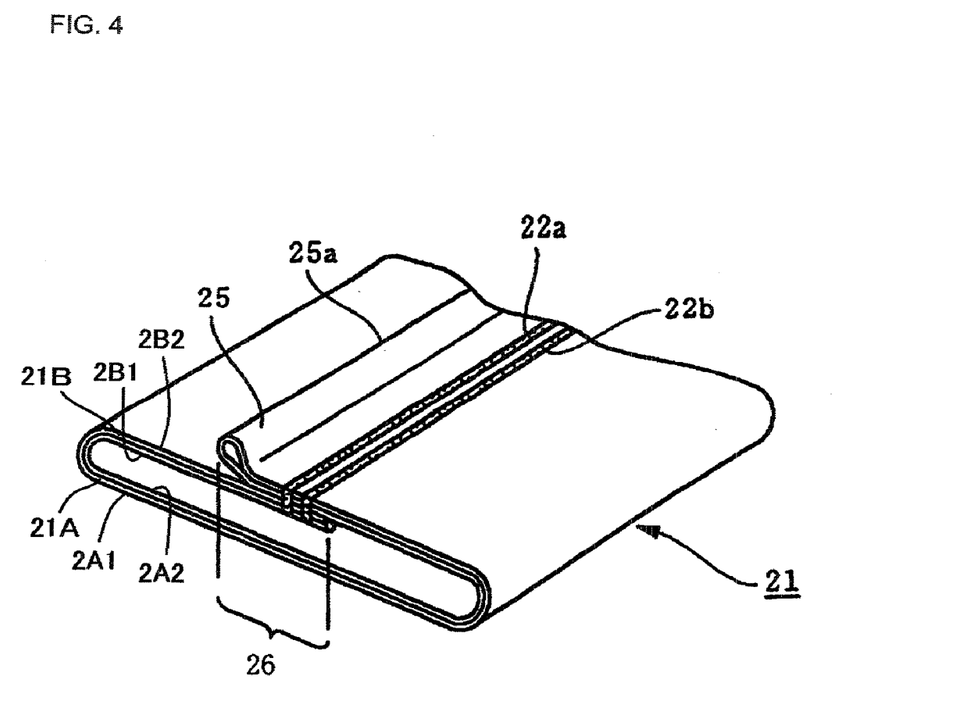
FIG. 4 is a partial perspective view of a state where a dual-structured laminated film of a dual structure is formed into a tubular shape.

With reference to FIG. 4, a material-filled package 21 of the present embodiment is formed from a double-laminated film formed by flattening a tubular body formed from the laminated film 10. The double-laminated film is arcuately bent into a tubular shape, and an overlap portion 26 (refer to FIG. 3) is formed by arranging both-side lateral edge portions thereof to overlap with one another. Then, in the state where a band-like non-seal portion 25 having a width (10 to 20 mm), which portion can be pinched by fingers an end 25a of an lateral edge portion located on the outer surface side in the overlap portion 26 is remained, a first vertical seal portion 22a is formed in substantially in parallel. In addition, a second vertical seal portion 22b is formed substantially in parallel to an opposite side (inner side) to the non-seal portion at a predetermined interval therefrom, thereby to form a tubular body.

Then, the tubular body is filled with a predetermined amount of a fill material, and lateral seal portions (not shown) are formed to intersect with the vertical seal portions 22a and 22b, thereby to seal the tubular body.

Lateral sealing in accordance with the first and second embodiments will be described herebelow.

Figure 6:
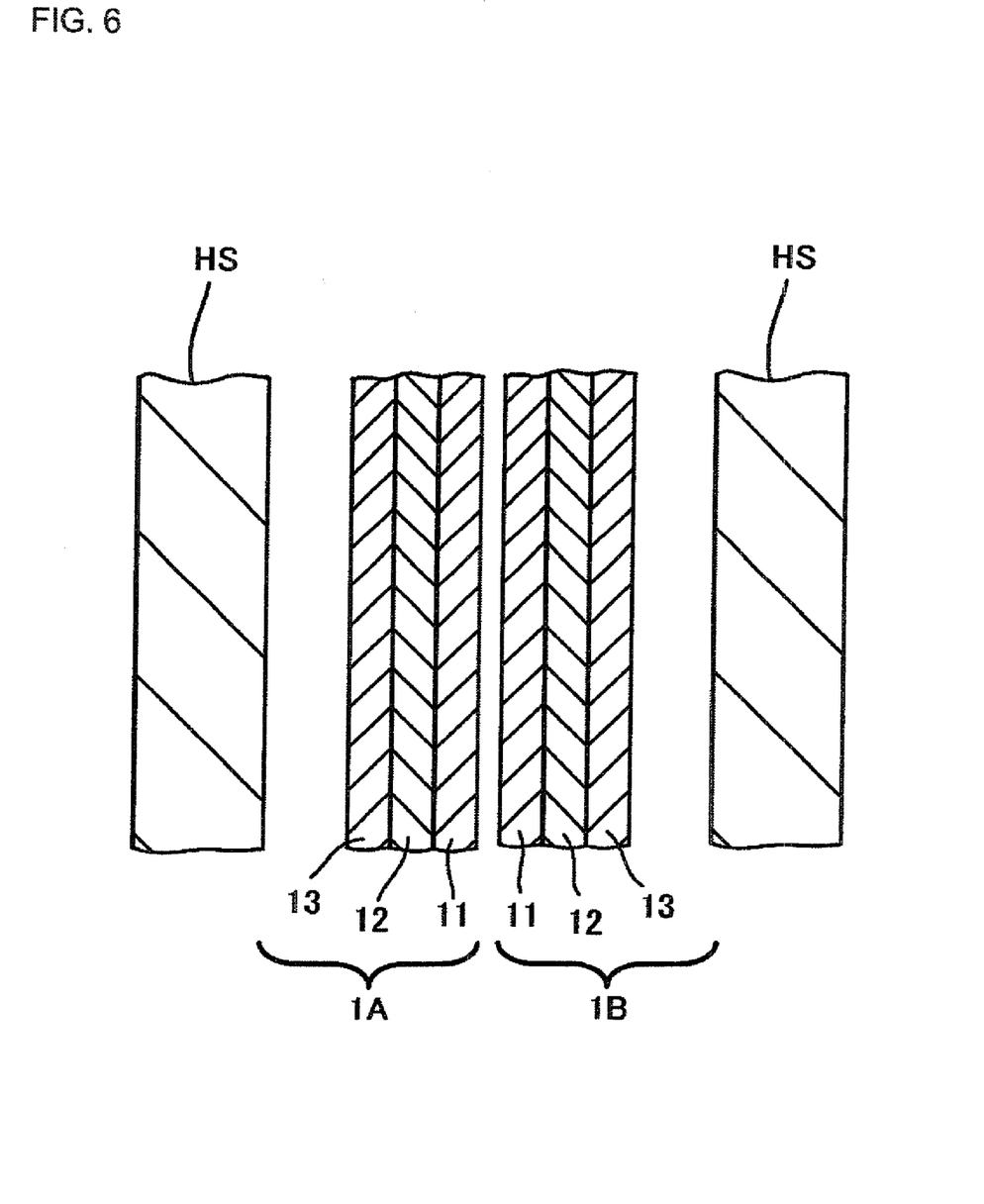
FIG. 6 is a partial sectional view for schematic explanation of the state of lateral sealing of a single laminated film.

FIG. 6 is a partial sectional view for schematic explanation of the state of lateral sealing of a single laminated film. Since the laminated film is arcuately bent into the tubular shape, inner layers 11 of the films 1A and 1B are welded together with easy-to-unseal property being imparted. More specifically, the films 1A and 1B interposed between heat seal bars HS receive heat of the heat seal bars HS, whereby the inner layers 11 are welded together.

Figure 7:
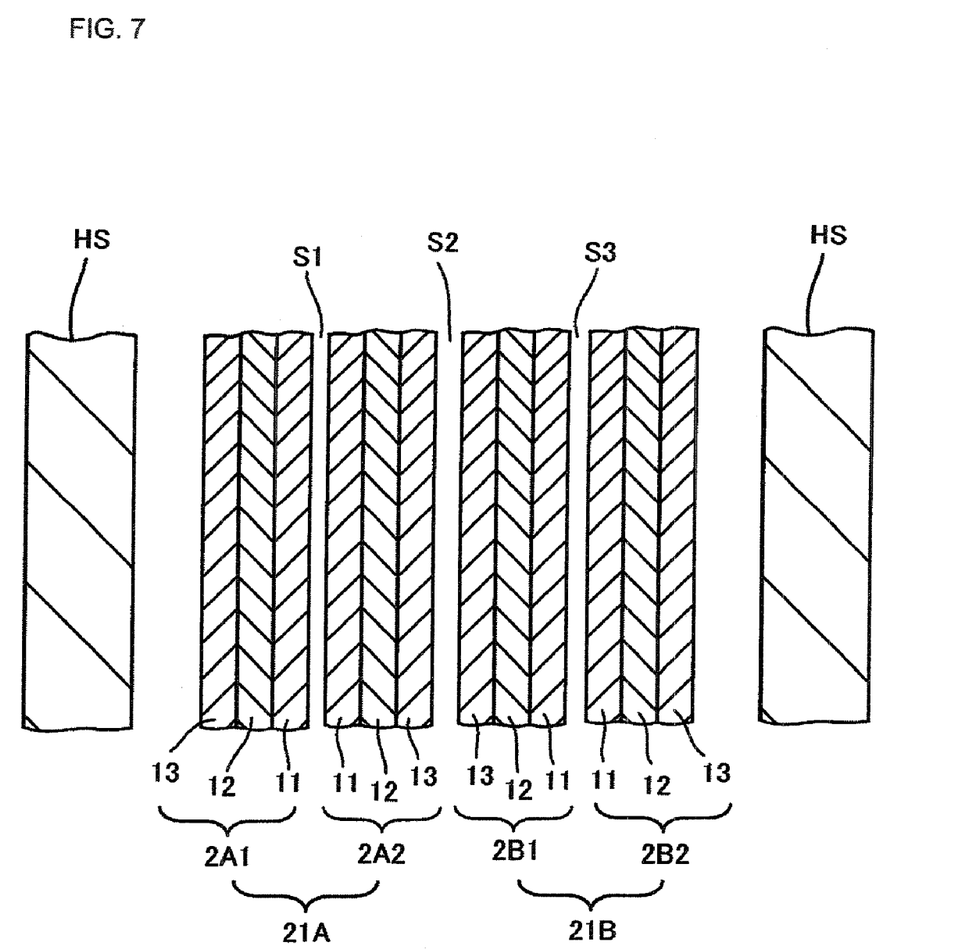
FIG. 7 is a partial sectional view for schematic explanation of the state of lateral sealing of a dual-structure laminated film.

FIG. 7 is a partial sectional view for schematic explanation of the state of lateral sealing of a dual-structure laminated film. Inner layers 11 are formed from a low density polyethylene, base layers 12 are formed from a drawn polyamide, and outer layers are formed from a resin composition having an easy-to-peel property. The resin composition is composed of an ethylene based resin, such as linear-chain low density ethylene-a olefin copolymer, and a propylene based resin, such as polypropylene/ethylene-propylene copolymer/ethylene-propylene-butane ternary polymer. The dual-structured laminated film is formed by an inflation molding into a tubular shape. Therefore, as shown in FIG. 7, lateral seal portions other than vertical-seal overlap portions are formed by one-time welding of four films 2A1, 2A2, 2B1, and 2B2. In the lateral sealing, three weld surfaces S1, S2, and S3 are welded at one time as seen from the cross-sectional direction. As shown in FIG. 7, with S1, the low density polyethylene inner layers 11 are welded together. Similarly, with S3, the low density polyethylene inner layers 11 are welded together. With the central weld surface S2, outer layers 13 formed from the resin composition having the easy-to-peel property are welded together. Heat retained by the heat seal bars HS is transferred to the films interposed between the heat seal bars HS. Since the base layer has a higher melting point than other layers, the layer is not fractured by heat seal. Since the outer layer adjacent to the heat seal bars HS is not directly affected by heat, it is effective to provide a Teflon film on the surface of the heat seal bars HS for preventing the outer layer from being fractured due to heat and pressure. In the case that the film laminated configuration is employed, the seal temperature is set to a range of from 150° C. to 160° C., and the sealing time is 1.5 sec.

Except for the differences described above, the configuration of the material-filled package formed of the dual-structured bag in accordance with the second embodiment is similar to the configuration of the first embodiment shown in FIG. 1. Further, except for the above-described differences, a packaging machine for manufacturing the material-filled package and a manufacturing method for the material-filled package are similar to those of the first embodiment. Therefore, descriptions of the common portions are omitted herefrom.

According to the present embodiment, the band-like non-seal portion 25 can easily be pinched by fingers, and elongation occurring when being pulled is reduced.

INDUSTRIAL APPLICABILITY

One embodiment of the present invention is a material-filled package in which any one of fill materials, including a viscous material such as ketchup, mayonnaise and flour paste, liquids such as refreshing drink, and solid material such as frozen "gyoza" (or, jiao-zi), is filled and packaged. In particular, one embodiment of the present invention is suited for material-filling packaging a viscous material that has liquidity during the filling operation and that makes it possible to maintain automorphic characteristics in a usage mode at an ambient temperature after packaging or during refrigeration of the material.

The invention claimed is:

1. A material-filled package formed with a fill material filled into a three-way sealed bag, the material-filled package comprising: an overlap portion formed in a manner that a laminated film is arcuately bent into a tubular shape and both-side edge portions of the laminated film are overlapped; a plurality of vertical seal portions formed substantially in parallel to one another in a state where a band-like non-seal portion is remained on an end side of a lateral edge portion on an outer surface side in the overlap portion; and lateral seal portions respectively formed to intersect with both longitudinal end portions of the vertical seal portions, wherein
the laminated film includes a seal layer formed from a low density polyethylene, and a base layer imparting a film strength;
said seal layer formed of low density polyethylene being welded to itself at said overlap portion; said base layer having a higher melting point than said seal layer; and
the vertical seal portions and the lateral seal portions are each composed of a coagulatively peelable and easily unsealable seal.

2. A material-filled package according to claim 1, wherein the base layer is formed from a non-oriented polyamide.

3. A material-filled package according to claim 1, wherein the vertical seal portions each have a seal width of less than 5 mm.

4. A material-filled package according to claim 1, wherein peel strengths of two lateral seal portions are different from each other.

5. A material-filled package according to claim 1, wherein, for strengths of the seal portions, a peel strength (N/15 mm) in the case of the vertical direction with respect to the seal direction is set to a range of from 5.0 to 12.0, and a peel strength (N/seal-width) in the case of the vertical direction with respect to the seal direction is set to a range of from 1.0 to 5.5.

6. A material-filled package formed with a fill material filled into a three-way sealed bag, the material-filled package comprising: an overlap portion formed in a manner that a double-laminated film formed by flattening a tubular body formed from a laminated film is arcuately bent into a tubular shape and both-side edge portions of the double-laminated film are overlapped; a plurality of vertical seal portions formed substantially in parallel to one another in a state where a band-like non-seal portion is remained on an end side of a lateral edge portion on an outer surface side in the overlap portion; and lateral seal portions respectively formed to intersect with both longitudinal end portions of the vertical seal portions, wherein:

the laminated film includes a seal layer formed from a low density polyethylene, and a base layer imparting a film strength; and the vertical seal portions and the lateral seal portions are each formed from an easily unsealable seal.

7. A material-filled package according to claim 6, wherein the easily unsealable seal is a coagulatively peelable and easily unsealable seal.

8. A material-filled package according to claim 6, wherein the base layer is formed from a non-oriented polyamide.

9. A material-filled package according to claim 6, wherein the vertical seal portions each have a seal width of less than 5 mm.

10. A material-filled package according to claim 6, wherein peel strengths of two lateral seal portions are different from each other.

11. A material-filled package according to claim 6, wherein, for strengths of the seal portions, a peel strength (N/15 mm) in the case of the vertical direction with respect to the seal direction is set to a range of from 5.0 to 12.0, and a peel strength (N/seal-width) in the case of the vertical direction with respect to the seal direction is set to a range of from 1.0 to 5.5.

* * * * *